(12) United States Patent
Jang et al.

(10) Patent No.: US 12,273,034 B2
(45) Date of Patent: Apr. 8, 2025

(54) POWER CONVERTING DEVICE, POWER MANAGEMENT INTEGRATED CIRCUIT, AND METHOD FOR CONTROLLING POWER CONVERTING DEVICE

(71) Applicant: LX Semicon Co., Ltd., Daejeon (KR)

(72) Inventors: Won Suk Jang, Daejeon (KR); Tae Kyu Nam, Daejeon (KR); Young Kook Ahn, Daejeon (KR); Sang Woo Kim, Daejeon (KR); Jung Woong Park, Daejeon (KR); Tae Heon Lee, Daejeon (KR); In Ho Jeon, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 253 days.

(21) Appl. No.: 18/090,212

(22) Filed: Dec. 28, 2022

(65) Prior Publication Data
US 2023/0216416 A1 Jul. 6, 2023

(30) Foreign Application Priority Data
Dec. 30, 2021 (KR) .......................... 10-2021-0192742

(51) Int. Cl.
*H02M 3/158* (2006.01)
*H02M 1/00* (2006.01)
*H02M 1/088* (2006.01)

(52) U.S. Cl.
CPC ....... *H02M 3/1586* (2021.05); *H02M 1/0032* (2021.05); *H02M 1/088* (2013.01); *G09G 2330/021* (2013.01); *H02M 3/1584* (2013.01)

(58) Field of Classification Search
CPC ............. H02M 3/1584; H02M 1/0032; H02M 3/1586; H02M 1/088; G09G 2330/021
See application file for complete search history.

(56) References Cited

U.S. PATENT DOCUMENTS

| 10,615,691 | B1* | 4/2020 | Miller ........................ G05F 1/62 |
| 10,679,540 | B2* | 6/2020 | Park ........................ H02M 3/158 |
| 11,049,474 | B2 | 6/2021 | Kim et al. |
| 11,087,664 | B2 | 8/2021 | Park et al. |
| 2016/0301311 | A1* | 10/2016 | Tt ........................ H02M 3/1584 |
| 2016/0308440 | A1* | 10/2016 | Yan ........................ H02M 3/158 |
| 2021/0167688 | A1* | 6/2021 | Hureau ............... H02M 3/1584 |

FOREIGN PATENT DOCUMENTS

KR 10-1625817 B1 5/2016

* cited by examiner

*Primary Examiner* — Harry R Behm
(74) *Attorney, Agent, or Firm* — POLSINELLI PC

(57) ABSTRACT

The present disclosure provides for sequentially turning on a plurality of power conversion modules according to the magnitude of load power at the time of driving the power conversion modules, operating power conversion modules which have already been turned on in an optimum efficiency interval, and providing increased load power through a power conversion module which has been newly turned on.

15 Claims, 8 Drawing Sheets

POWER CONVERTING DEVICE, POWER MANAGEMENT INTEGRATED CIRCUIT, AND METHOD FOR CONTROLLING POWER CONVERTING DEVICE

CROSS-REFERENCE TO RELATED APPLICATION

This application claims the priority of Korean Patent Application No. 10-2021-0192742 filed on Dec. 30, 2021, which is hereby incorporated by reference in its entirety.

BACKGROUND

Field of the Disclosure

The present disclosure relates to a power converting device, a power management integrated circuit, and a method for controlling the power converting device.

Description of the Background

Electronic devices such as display devices require power having a constant voltage. For example, an electronic device may require power having a DC voltage such as 3.3 V or 5 V.

Meanwhile, power supplied from a power source may have a different voltage or shape from the power required by an electronic device. As an example, when a commercial power grid is used as a power source, the power source may supply power in an AC form. As another example, when a battery is used as a power source, a voltage of power supplied from the power source may be different from a voltage of power required by an electronic device.

To resolve such mismatch, a power converter can be disposed between a power source and an electronic device. The power converter can convert power supplied from the power source into a form of power required by the electronic device. For example, the power converter may convert an AC voltage into a DC voltage, convert a high voltage into a low voltage, or convert a low voltage into a high voltage.

The power converter may convert a high voltage into a low voltage or convert a low voltage into a high voltage by adjusting the on-off time of a power semiconductor.

However, loss may occur in power conversion using a power semiconductor. For example, conduction loss may occur when the power semiconductor is turned on, and switching loss may occur when the power semiconductor is turned off. Such loss may lead to decrease in the efficiency of the power converter.

The above information disclosed in this Background section is only for enhancement of understanding of the background of the described technology and therefore it may contain information that does not form prior art that is already known to a person of ordinary skill in the art.

SUMMARY

In view of such circumstances, the present disclosure is to provide a power converting device, a power management integrated circuit, and a method for controlling the power converting device for improving the efficiency of power conversion.

More specifically, the present disclosure is to provide a power converting device, a power management integrated circuit, and a method for controlling the power converting device for driving a plurality of power conversion modules with optimum efficiency at the time of driving the plurality of power conversion modules in parallel.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a power converter includes a first power conversion module for which a first upper current limit is set, a second power conversion module disposed in parallel to the first power conversion module, for which a second upper current limit set, and a controller configured to control the first power conversion module such that the first power conversion module supplies a first increment in load power in a state in which the second power conversion module is turned off, to turn on the second power conversion module when an output current of the first power conversion module reaches the first upper current limit, and to control the second power conversion module such that the second power conversion module supplies a second increment in the load power in a state in which the output current of the first power conversion module is maintained as the first upper current limit.

In another aspect of the present disclosure, a power management integrated circuit includes a first module driver configured to control a duty of a first power semiconductor included in a first power conversion module, a second module driver configured to control a duty of a second power semiconductor included in a second power conversion module disposed in parallel to the first power conversion module, and a controller configured to control the first module driver such that the first power conversion module supplies a first increment in load power in a state in which the second power conversion module is turned off, to turn on the second power conversion module when an output current of the first power conversion module reaches a first upper current limit, and to control the second module driver such that the second power conversion module supplies a second increment in the load power in a state in which the output current of the first power conversion module is maintained as the first upper current limit.

In a further aspect of the present disclosure, a method for controlling a power converter, includes turning on a first power conversion module and supplying a first increment in load power using the first power conversion module, turning on a second power conversion module when an output current of the first power conversion module reaches a first upper current limit, and maintaining the output current of the first power conversion module as the first upper current limit and supplying a second increment in the load power using the second power conversion module.

As described above, according to the present disclosure, the efficiency of power conversion can be increased. In addition, a plurality of power conversion modules can be driven with optimum efficiency at the time of driving the power conversion modules in parallel. Further, high efficiency of power conversion can be maintained even in an interval in which load power is low or high.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Reference will now be made in detail to the aspects of the present disclosure, examples of which are illustrated in the accompanying drawings. Wherever possible, the same reference numbers will be used throughout the drawings to refer to the same or like parts.

Figure 1:
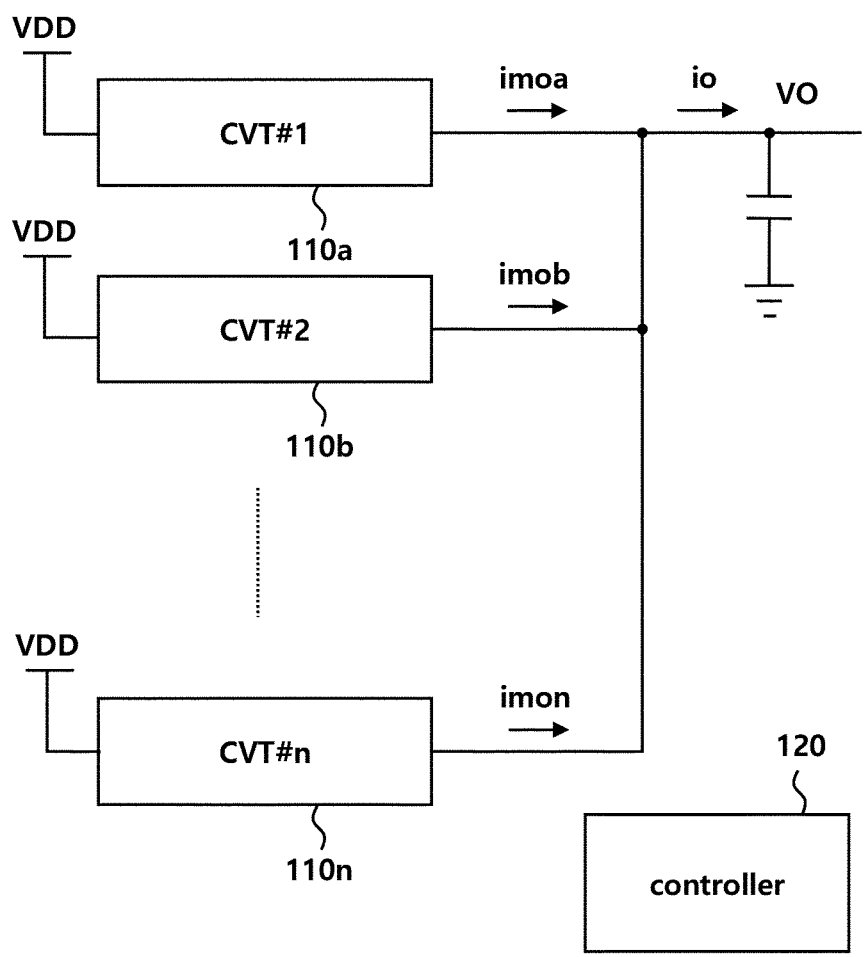
FIG. 1 is a configuration diagram of a power converter according to the present disclosure.

FIG. 1 is a configuration diagram of a power converter according to an disclosure.

Referring to FIG. 1, the power converter 100 may include a plurality of power conversion modules 110a to 110n and a controller 120.

The plurality of power conversion modules 110a to 110n (CVT #1 to CVT #n) may receive power having a high driving voltage VDD and supply power having a load voltage VO to a load through power conversion.

The plurality of power conversion modules 110a to 110n may be arranged in parallel.

The plurality of power conversion modules 110a to 110n may be connected to a common input node. In addition, the plurality of power conversion modules 110a to 110n may commonly receive the high driving voltage VDD through the input node.

The plurality of power conversion modules 110a to 110n may be connected to a common output node.

Output currents imoa, imob, . . . imon from the power conversion modules 110a to 110n may be combined to form a load current io. Further, the magnitude of load power may be determined by the product of the load current io and the load voltage VO.

The controller 120 may control the plurality of power conversion modules 110a to 110n.

The controller 120 may control turn-on and turn-off of each of the power conversion modules 110a to 110n. The controller 120 may turn on some of the plurality of power conversion modules 110a to 110n and turn off some of the remaining power conversion modules 110a to 110n.

The controller 120 may control the amount of power processed by each of the power conversion modules 110a to 110n. The controller 120 may determine the amount of power processed by each of the power conversion modules 110a to 110n depending on the load power and control the power conversion modules 110a to 110n to divide and process the load power.

Assuming that the load voltage VO is fixed, the controller 120 may control the amount of current processed by each of the power conversion modules 110a to 110n to adjust the amount of power processed by each of the power conversion modules 110a to 110n.

For such control, the power conversion modules 110a to 110n may perform current control. In a current control mode, the power conversion modules 110a to 110n may generate output currents imoa, imob, . . . imon to correspond to a reference current.

An upper current limit may be set for each of the power conversion modules 110a to 110n. For example, a first upper current limit may be set for the first power conversion module 110a, and a second upper current limit may be set for the second power conversion module 110b.

The controller 120 can control the amount of power processed by each of the power conversion modules 110a to 110n, and at this time, the output currents imoa, imob, . . . imon from the power conversion modules 110a to 110n may be limited to the upper current limits set for the power conversion modules 110a to 110n.

The controller 120 may sequentially turn on the power conversion modules 110a to 110n depending on the magnitude of the load power. For example, the controller 120 may turn on the first power conversion module 110a to supply the load power, and when the load power increases and thus the first output current imoa of the first power conversion module 110a reaches the first upper current limit, turn on the second power conversion module 110b. In the same manner, the controller 120 may turn on a K-th power conversion module (K being a natural number equal to or greater than 2) when the load power increases and thus a (K−1)-th output current of a (K−1)-th power conversion module reaches a (K−1)-th upper current limit.

When the controller 120 turns on one power conversion module, the controller 120 may maintain the output current of the previously turned-on power conversion module as the upper current limit. For example, when the controller 120 turns on the second power conversion module 110b, the controller 120 may maintain the first output current imoa of the previously turned-on first power conversion module 110a as the first upper current limit. When the controller 120 turns on the K-th power conversion module, the controller 120 may maintain the output currents of the first power conversion module to the (K−1)-th power conversion module as the corresponding current upper limits.

A newly turned-on power conversion module can supply an increment in the load power.

For example, the first power conversion module 110a that is turned on for the first time may supply a first increment in the load power from 0 A. When the first power conversion module 110a operates with the first upper current limit, a second increment other than the load power supplied by the first power conversion module 110a may be supplied by the second power conversion module 110b. When the second power conversion module 110b operates with the second upper current limit, a third increment other than the load power supplied by the first power conversion module 110a and the second power conversion module 110b may be supplied by the third power conversion module.

Figure 2:
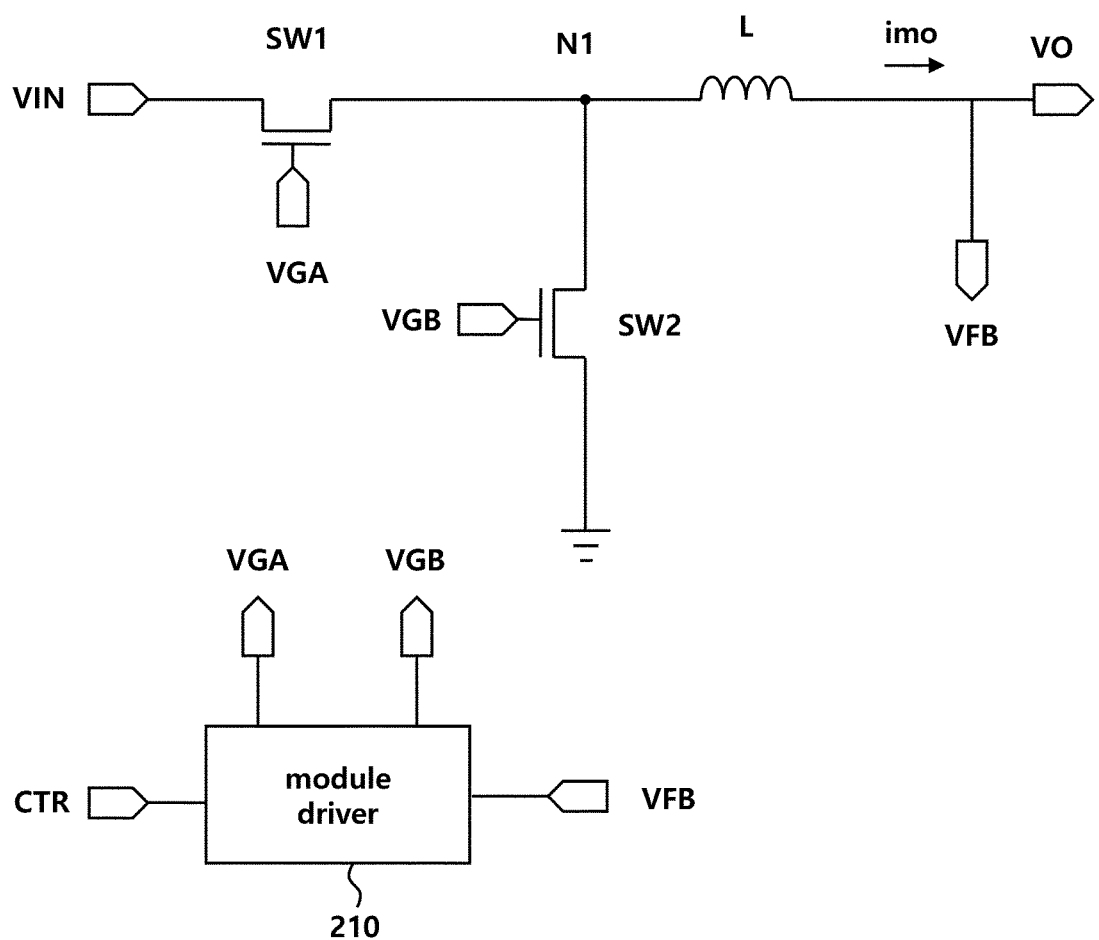
FIG. 2 is a configuration diagram of a power conversion module according to the present disclosure.

FIG. 2 is a configuration diagram of the power conversion module according to the present disclosure.

Referring to FIG. 2, the power conversion module 110 may include a plurality of power semiconductors SW1 and SW2, an inductor L, a module driver 210, and the like.

As an input voltage VIN of the power conversion module 110, the high driving voltage (refer to VDD in FIG. 1) may be supplied. The plurality of power semiconductors SW1 and SW2 may be connected in series between the input voltage VIN and a low driving voltage (e.g., a ground voltage). When the high driving voltage is supplied as the input voltage VIN, the plurality of power semiconductors SW1 and SW2 may be connected in series between the high driving voltage and the low driving voltage.

The plurality of power semiconductors SW1 and SW2 may operate as a buck converter. For example, in the power conversion module 110, the first power semiconductor SW1 connected to the high driving voltage is turned on and the second power semiconductor SW2 connected to the low driving voltage is turned off in an on-duty interval of a control period, and thus the high driving voltage can be supplied to one end N1 of the inductor. In addition, in an off-duty interval of the control period, the first power semiconductor SW1 is turned off and the second power semiconductor SW2 is turned on, and thus the low driving voltage can be supplied to one end N1 of the inductor. The power conversion module 110 may determine the level of the load voltage VO and the magnitude of the output current imo by adjusting the time of the on-duty interval of the control period.

Signals VGA and VGB for driving the gates of the plurality of power semiconductors SW1 and SW2 may be generated by the module driver 210.

The module driver 210 may receive a feedback signal VFB determined according to the load voltage VO and determine a duty for the plurality of power semiconductors SW1 and SW2 according to the feedback signal VFB. For example, the module driver 210 may increase the duty when the voltage level of the feedback signal VFB decreases and decrease the duty when the voltage level of the feedback signal VFB increases.

The module driver 210 may receive a control signal CTR from the controller (120 in FIG. 1). The control signal CTR may include a signal (on/off control signal) for determining turn on/off of the power semiconductor module 110, a signal (voltage control signal) for determining the level of the load voltage VO, and a signal (current control signal) for determining the level of the output current imo.

When the on-off control signal indicating turn-on is received, the module driver 210 supplies the gate driving signals VGA and VGB to the plurality of power semiconductors SW1 and SW2 to operate the power conversion module 110. In addition, the module driver 210 may not operate the power conversion module 110 by turning off all of the plurality of power semiconductors SW1 and SW2 when the on-off control signal indicating turn-off is received.

The module driver 210 may adjust the level of the load voltage VO by comparing a reference voltage value included in the voltage control signal with the feedback signal VFB.

Further, the module driver 210 may adjust the magnitude of the output current imo through current control of the power conversion module 110 according to a reference current value included in the current control signal.

An upper current limit of the power conversion module 110 may be determined according to the current control signal. When the current control signal includes a constant reference current value and the power conversion module 110 is current-controlled according to this reference current value, the output current imo of the power conversion module 110 may not exceed a certain value (upper current limit).

The power conversion module 110 may perform pulse skip control to increase efficiency at low power.

Figure 3:
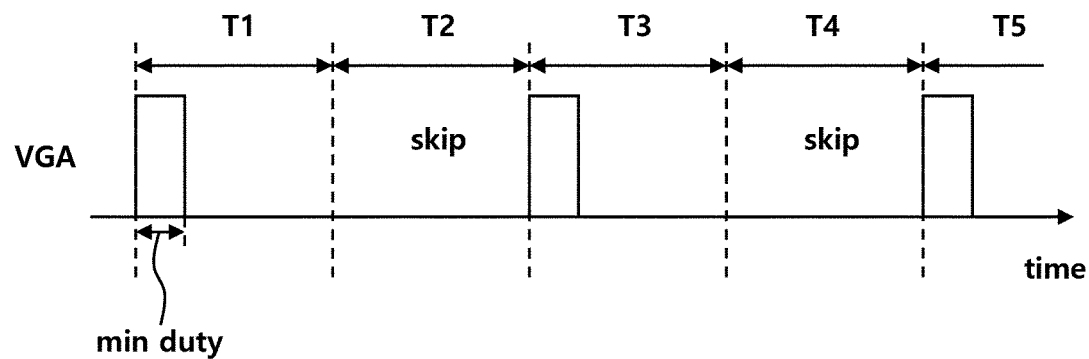
FIG. 3 is a diagram for describing pulse skip control of the power conversion module according to the present disclosure.

FIG. 3 is a diagram for describing pulse skip control of the power conversion module according to the present disclosure.

Referring to FIG. 3, the gate driving signal VGA may not be output in some control periods at low power.

For example, the gate driving signal VGA may be output in a first control period T1, a third control period T3, and a fifth control period T5 and may be skipped in a second control period T2 and a fourth control period T4.

The power conversion module can adjust the amount of power to be processed while maintaining a minimum duty through such pulse skip control. The amount of power to be processed may decrease as the proportion of skipped control periods among the control periods T1 to T5 increases and the amount of power to be processed may increase as the proportion of the skipped control periods decreases.

The power conversion module can maintain relatively high efficiency even in a low power interval through this pulse skip control.

The power conversion module may perform pulse skip control for skipping power conversion in some control periods when the amount of power to be processed is equal to or less than a preset lower limit reference value. When the amount of power to be processed exceeds the lower limit reference value, the power conversion module may adjust the amount of power to be processed by adjusting the duty.

Figure 4:
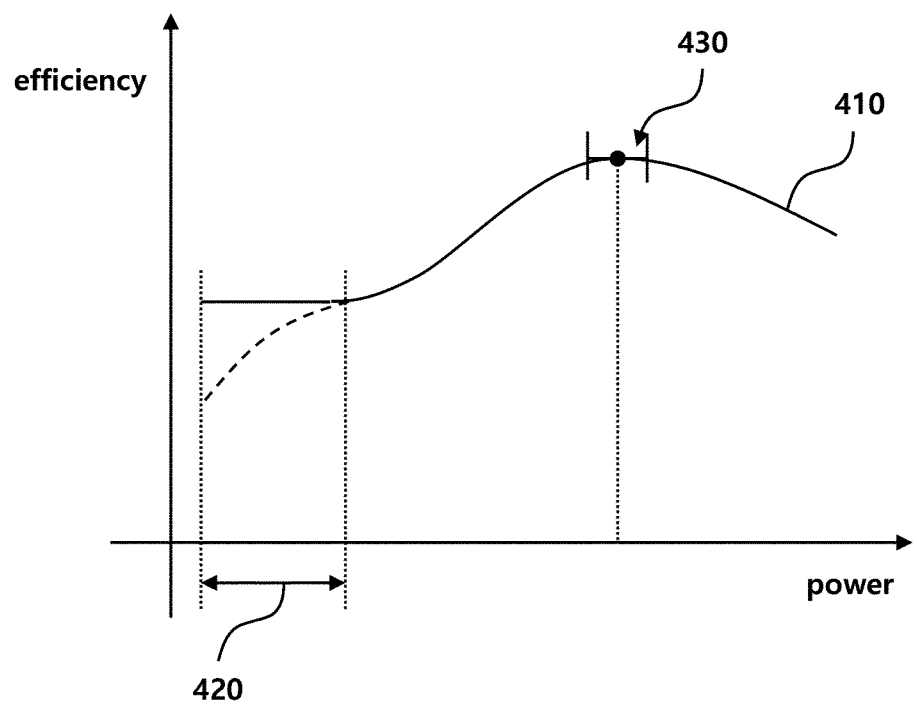
FIG. 4 is a diagram showing an efficiency curve of the power conversion module according to the present disclosure.

FIG. 4 is a diagram showing an efficiency curve of the power conversion module according to the present disclosure.

Referring to FIG. 4, the power conversion module may have an efficiency curve 410 having the highest efficiency when the amount of power to be processed is medium and exhibiting that the efficiency decreases as the load increases at the highest efficiency point and decreases as the load decreases at the highest efficiency point.

The power conversion module may perform pulse skip control as described with reference to FIG. 3 in order to minimize efficiency reduction in a low power interval 420. Through this pulse skip control, the power conversion module can maintain constant efficiency in the low power interval 420.

The power conversion module may maintain the amount of power to be processed in an optimum efficiency range 430 for operation with optimum efficiency. When the load voltage is fixed, the amount of power to be processed may be determined by the magnitude of the output current, and the power conversion module may adjust the magnitude of the output current such that the amount of power to be processed falls within the optimum efficiency range 430.

The power conversion module can maintain the output current as the upper current limit, and such an upper current limit may be a current value corresponding to the previously confirmed optimum efficiency range 430 of the power conversion module. For example, the first upper current limit of the first power conversion module may be a current value corresponding to the optimum efficiency range of the first power conversion module, and the second upper current limit of the second power conversion module may be a current value corresponding to the optimum efficiency range of the second power conversion module.

Through this control, the power conversion module can operate with optimum efficiency.

Figure 5:
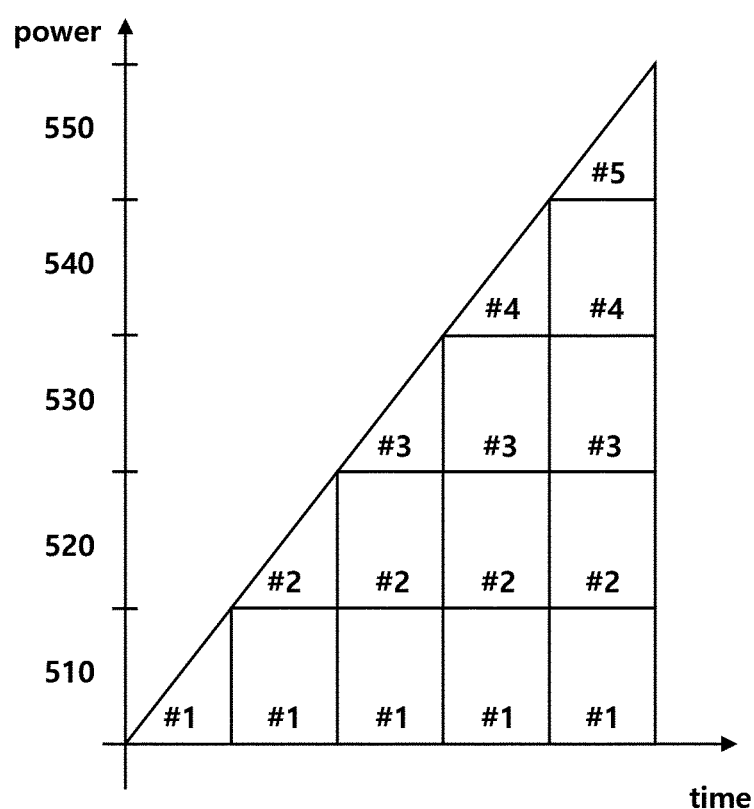
FIG. 5 is a diagram for describing a method in which a plurality of power conversion modules divides and processes load power while operating with optimum efficiency according to the present disclosure.

FIG. 5 is a diagram for describing a method in which a plurality of power conversion modules divides and processes load power while operating with optimum efficiency according to the present disclosure.

Referring to FIG. 5, the power converter may supply a first increment 510 in load power through the first power conversion module in a state in which the second power conversion module to the fifth power conversion module are turned off.

The first power conversion module may perform pulse skip control when the first increment 510 is equal to or less than a preset lower limit reference value and supply the first increment 510 to the load while adjusting the duty when the first increment 510 exceeds the lower limit reference value.

An upper current limit may be set for each power conversion module. A first upper current limit may be set for the first power conversion module, a second upper current limit may be set for the second power conversion module, a third upper current limit may be set for the third power conversion module, a fourth upper current limit may be set for the fourth power conversion module, and a fifth upper current limit may be set for the fifth power conversion module.

The upper current limits may have the same value or may have different values. For example, the first upper current limit and the second upper current limit may have different values. Since the upper current limit is a current value corresponding to the optimum efficiency range of each power conversion module, power conversion modules having the same characteristics may have the same upper current limit value, and power conversion modules having different characteristics may have different upper current limits.

When the magnitude of the first increment 510 increases and the output current of the first power conversion module reaches the first upper current limit, the second power conversion module may be turned on to supply a second increment 520 in the load power in a state in which the output current of the first power conversion module is maintained as the first upper current limit. At this time, the first power conversion module may maintain the output current as the first upper current limit through current control.

When the magnitude of the second increment 520 is small, the second power conversion module may perform pulse skip control like the first power conversion module. The second power conversion module may increase the duty when the second increment 520 increases, and when the output current of the second power conversion module reaches the second upper current limit, the third power conversion module may be turned on. At this time, the first power conversion module and the second power conversion module may be controlled by the upper current limits and an increment in the load power may be supplied by the third power conversion module.

When the (N−1)-th power conversion module reaches an upper power limit in the same manner as the load power increases, the N-th power conversion module may be turned on to supply the increased amount of power.

When all the power conversion modules reach the upper current limits and the load power additionally increases, the load power can be supplied by increasing the upper current limit value of each power conversion module.

Figure 6:
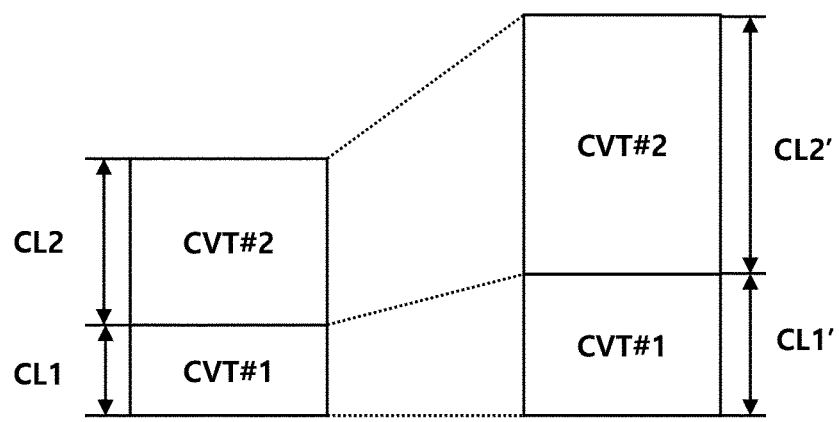
FIG. 6 is a diagram showing increasing upper current limits of power conversion modules according to the present disclosure.

FIG. 6 is a diagram showing increasing the upper current limits of the power conversion modules according to the present disclosure.

Referring to FIG. 6, the controller of the power converter may increase the values of the first upper current limit and the second upper current limit in response to an increment in the load power in a state in which the first power conversion module performs current control to reach the first upper current limit CL1 and the second power conversion module performs current control to reach the second upper current limit CL2.

The controller can increase the upper current limits at the same rate for all power conversion modules. For example, the controller may determine an increased first upper current limit CL1' by multiplying the first upper current limit CL1 by a predetermined value and determine an increased second upper current limit CL2' by multiplying the second upper current limit CL2 by the same value.

Although the size of the power semiconductors included in the first power conversion module may be different from the size of the power semiconductors included in the second power conversion module and thus the first upper current limit CL1 may be different from the second upper current limit CL2, if increased upper current limits are determined by multiplying such upper current limits by the same value, load power increased in proportion to the amount of power to be processed by each power conversion module can be distributed.

However, the upper current limits may be increased at different rates instead of the same rate according to an disclosure. For example, when the efficiency characteristics of a specific power conversion module are low or operating conditions (e.g., temperature) of a specific power conversion module are bad, the increase rate of the upper current limit of the corresponding power conversion module may be set low.

Although not shown in the figure, turned-on power conversion modules may be controlled to be interleaved. The controller may determine a start time of the control period of the turned-on power conversion modules, and the controller may interleave the turned-on power conversion modules by applying a phase-shift to this start time.

The power converter may be included in a display device and provide converted power to components of the display device.

Figure 7:
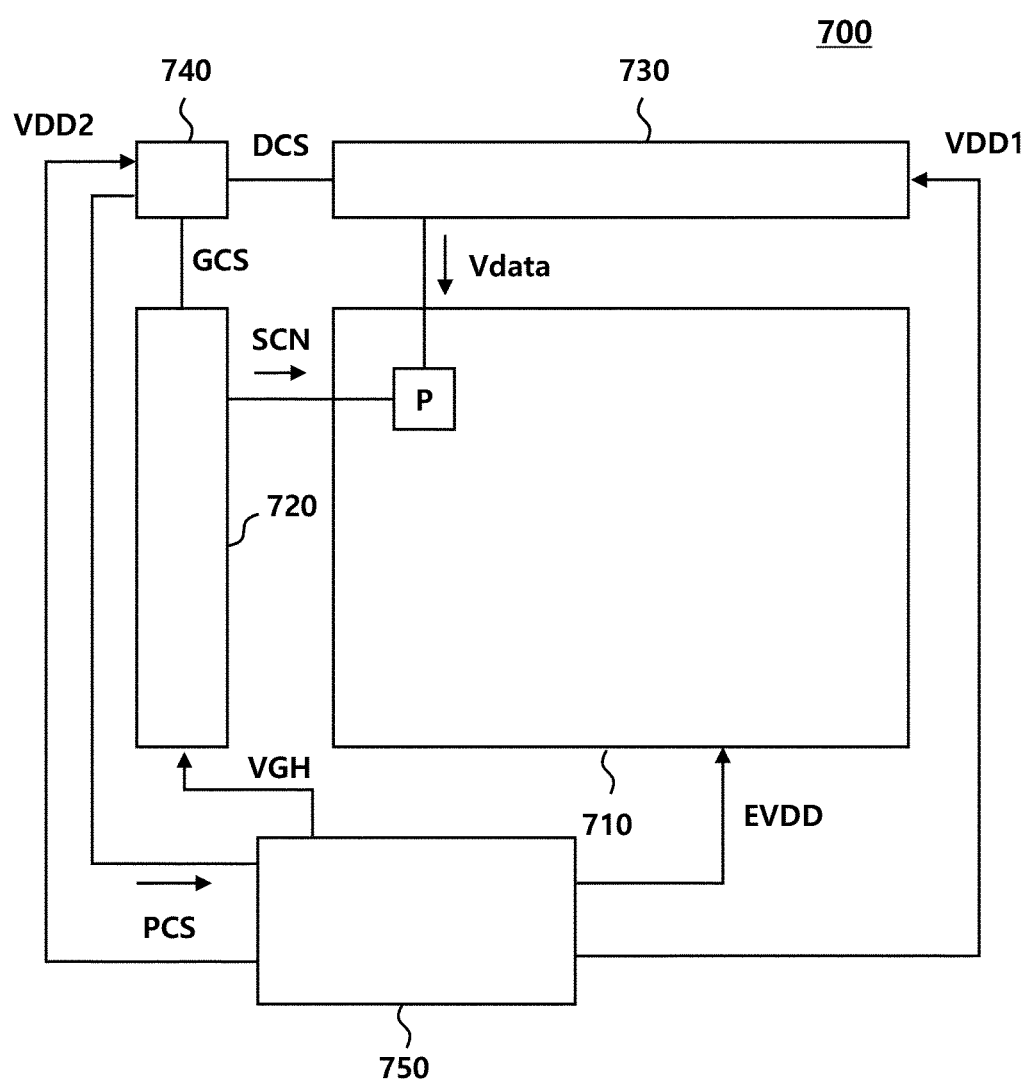
FIG. 7 is a configuration diagram of a display device according to the present disclosure.

FIG. 7 is a configuration diagram of a display device according to the present disclosure.

Referring to FIG. 7, the display device 700 may include a display panel 710, a gate driver 720, a source driver 730, a data processor 740, and a power management integrated circuit 750.

A plurality of pixels P may be disposed in the display panel 710. Each pixel P may include a light emitting element such as a light emitting diode (LED) and may include liquid crystal for controlling transmittance of backlight light. When the pixel P includes a light emitting element, a pixel driving voltage EVDD may be supplied to each pixel P.

The gate driver 720 may supply a scan signal SCN to the display panel 710 to select pixels disposed on one line among the plurality of pixels P disposed in the display panel 710. The scan signal SCN may include a gate high voltage VGH and a gate low voltage, and pixels of a line to which the gate high voltage VGH is supplied can be selected.

The source driver 730 may supply a data voltage Vdata to the pixels selected by the scan signal SCN. In addition, the pixels P may adjust a grayscale according to the data voltage Vdata. The source driver 730 may generate the data voltage Vdata using a first driving voltage VDD1.

The data processor 740 may convert image data received from the outside to match the characteristics of the display panel 710 and then transmit the converted image data to the source driver 730. The source driver 730 may generate the data voltage Vdata according to the grayscale value of each pixel included in the image data. The data processor 740 may transmit a control signal to each component. The data processor 740 may transmit a data control signal DCS to the source driver 730 and may transmit a gate control signal GCS to the gate driver 720. In addition, the data processor 740 may transmit a power control signal PCS to the power management integrated circuit 750. The data processor 740 may generate the control signals DCS, GCS, and PCS using a second driving voltage VDD2.

The power management integrated circuit 750 may supply power voltages to components constituting the display device 700. The power management integrated circuit 750 may supply the pixel driving voltage EVDD to the display panel 710, supply the gate high voltage VGH to the gate driver 720, supply the first driving voltage VDD1 to the source driver 730, and supply the second driving voltage VDD2 to the data processor 740.

Figure 8:
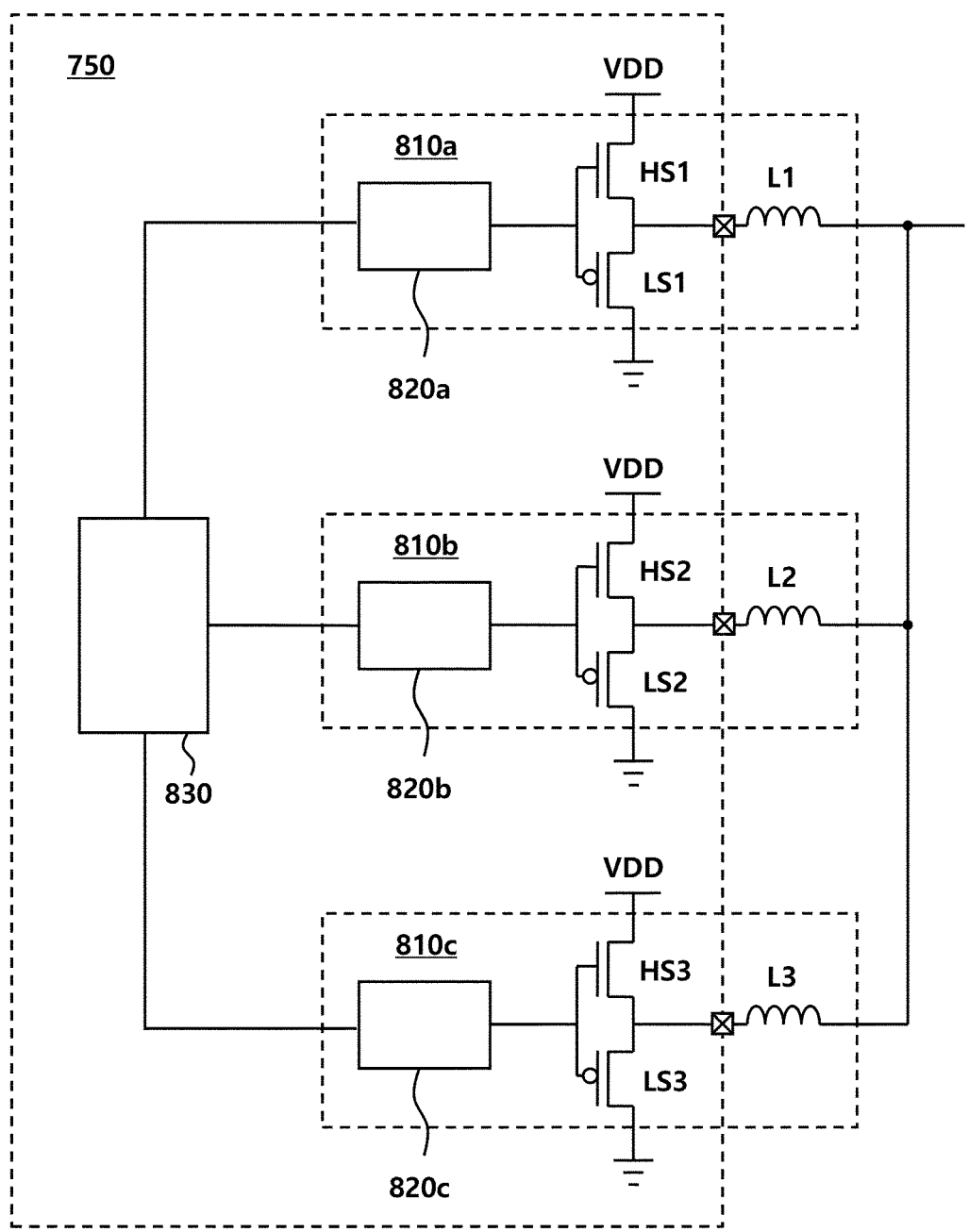
FIG. 8 is a diagram showing a power management integrated circuit and a peripheral configuration thereof according to the present disclosure.

FIG. 8 is a diagram showing the power management integrated circuit and a peripheral configuration thereof according to the present disclosure.

Referring to FIG. 8, the power management integrated circuit 750 may include a plurality of module drivers 820a to 820c, a controller 830, and the like.

Each of the module drivers 820a to 820c may be included in each power conversion module. For example, the first module driver 820a may be included in the first power conversion module 810a, the second module driver 820b may be included in the second power conversion module 810b, and the third module driver 820c may be included in the third power conversion module 810c.

Each of the module drivers 820a to 820c may control a plurality of power semiconductors included in each of the power conversion modules 810a to 810c. For example, the first module driver 820a may control a first high-side power semiconductor HS1 and a first low-side power semiconductor LS1 included in the first power conversion module 810a, the second module driver 820b may control a second high-side power semiconductor HS2 and a second low-side power semiconductor LS2 included in the second power conversion module 810b, and the third module driver 820c may control a third high-side power semiconductor HS3 and a third low-side power semiconductor LS3 included in the third power conversion module 810c.

The power conversion modules 810a to 810c, the module drivers 820a to 820c, and the controller 830 may perform all the functions of the power conversion modules, the module driver and the controller described with reference to FIGS. 1 to 7.

For example, the first module driver 820a may control the duty of the first high-side power semiconductor HS1 included in the first power conversion module 810a, the second module driver 820b may control the duty of the second high-side power semiconductor HS2 included in the second power conversion module 810b, and the third module driver 820c may control the duty of the third high-side power semiconductor HS3 included in the third power conversion module 810c.

The controller 830 may control the first module driver 820a such that the first power conversion module 810a supplies the first increment in the load power in a state in which the second power conversion module 810b is turned off. Then, when the output current of the first power conversion module 810a reaches the first upper current limit, the controller 830 may turn on the second power conversion module 810b and control the second module driver 820b such that the second power conversion module 810b supplies the second increment in the load power in a state in which the output current of the first power conversion module 810a is maintained as the upper current limit.

In the same manner, the controller 830 may turn on the N-th power conversion module when the (N-1)-th power conversion module reaches the upper power limit according to increase in the load power, and provide the increased amount of power through the N-th power conversion module. Here, N is a natural number of 3 or higher.

The controller 830 may control the module drivers 820a to 820c such that the high-side power semiconductors HS1 to HS3 are turned on at different times when all the power conversion modules 810a to 810c operate for interleaving control.

The power semiconductors included in the power conversion modules 810a to 810c have different sizes and thus different upper current limits may be set for the power conversion modules 810a to 810c. For example, the size of the first high-side power semiconductor HS1 may be less than the size of the second high-side power semiconductor HS2, and the upper current limit of the first power conversion module 810a may be less than the upper current limit of the second power conversion module 810b.

The power management integrated circuit 750 may be manufactured as one integrated circuit package through a semiconductor process, and at this time, the inductors L1 to L3 may be disposed outside the integrated circuit and the power semiconductors HS1 to HS3 and LS1 to LS3 may be disposed inside the integrated circuit. In addition, the module drivers 820a to 820c and the controller 830 may be disposed inside the integrated circuit.

Figure 9:
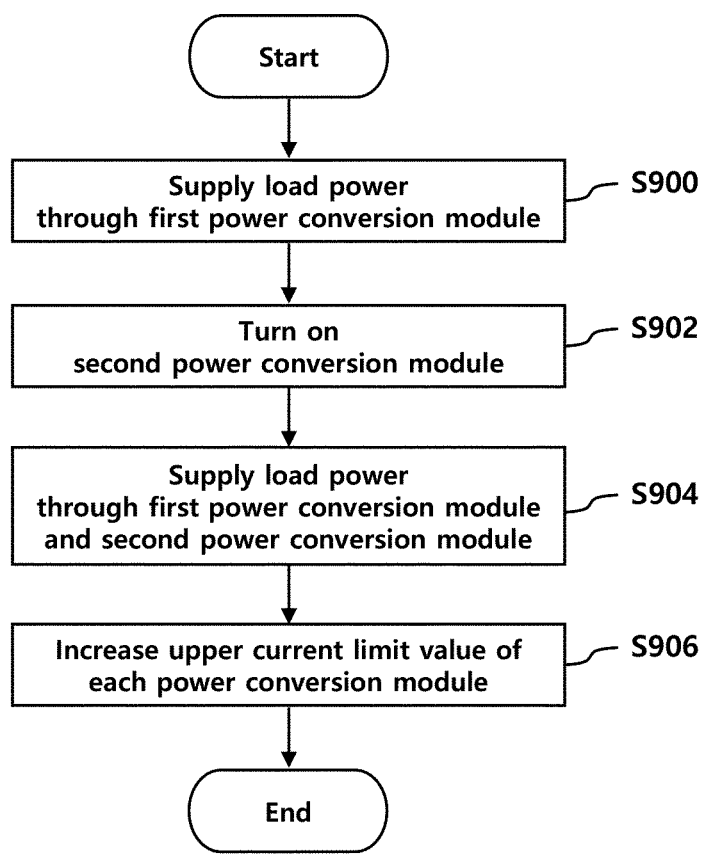
FIG. 9 is a flowchart of a method for controlling a power converter according to the present disclosure.

FIG. 9 is a flowchart of a method for controlling the power converter according to the present disclosure.

Referring to FIG. 9, the power converter may turn on the first power conversion module and supply a first increment in load power using the first power conversion module (S900).

A lower duty limit value may be set in the first power semiconductor included in the first power conversion module, and when the duty of the first power semiconductor reaches the lower duty limit value, the first power conversion module may perform pulse skip control for skipping power conversion in some control periods in the step of supplying the first increment in the load power using the first power conversion module.

Then, the power converter may turn on the second power conversion module when the output current of the first power conversion module reaches the first upper current limit (S902).

Thereafter, the power converter may maintain the output current of the first power conversion module as the first upper current limit and supply a second increment in the load power using the second power conversion module (S904).

Then, when the output current of the second power conversion module reaches the second upper current limit, the power converter may increase the values of the first upper current limit and the second upper current limit in order to supply a third increment in the load power (S906).

As described above, according to the present disclosure, the efficiency of power conversion can be increased. In addition, a plurality of power conversion modules can be driven with optimum efficiency at the time of driving the power conversion modules in parallel. Further, high efficiency of power conversion can be maintained even in an interval in which load power is low or high.

It will be apparent to those skilled in the art that various modifications and variations can be made in the power converting device, the power management integrated circuit, and the method for controlling the power converting device of the present disclosure without departing from the spirit or scope of the aspects. Thus, it is intended that the present disclosure covers the modifications and variations of the aspects provided they come within the scope of the appended claims and their equivalents.

What is claimed is:

1. A power converter comprising:
 a first power conversion module for which a first upper current limit is set;
 a second power conversion module disposed in parallel to the first power conversion module, for which a second upper current limit is set; and
 a controller configured
 to control the first power conversion module such that the first power conversion module supplies a first increment in load power in a first state in which the second power conversion module is turned off,
 to turn on the second power conversion module when an output current of the first power conversion module reaches the first upper current limit, and
 to control the second power conversion module such that the second power conversion module supplies a second increment in the load power in a second state in which the output current of the first power conversion module is maintained at the first upper current limit,
 wherein the controller is configured to increase values of the first upper current limit and the second upper current limit to supply a third increment in the load power, and
 wherein the controller is configured to increase the values of the first upper current limit and the second upper current limit at a same rate in response to the third increment in the load power.

2. The power converter according to claim 1, wherein the first upper current limit is a first current value corresponding to a previously confirmed optimum efficiency range of the first power conversion module, and the second upper current limit is a second current value corresponding to a previously confirmed optimum efficiency range of the second power conversion module.

3. The power converter according to claim 1, wherein the first power conversion module performs pulse skip control for skipping power conversion in some control periods when the first increment is equal to or less than a preset lower limit reference value.

4. The power converter according to claim 1, wherein the first power conversion module maintains the output current of the first power conversion module as the first upper current limit through current control.

5. The power converter according to claim 1, wherein the first upper current limit has a value different from the second upper current limit.

6. The power converter according to claim 1, wherein the first power conversion module includes a first power semiconductor having a first size different from a second size of a second power semiconductor included in the second power conversion module.

7. The power converter according to claim 1, wherein the controller performs interleaving control for the first power conversion module and the second power conversion module in a state in which both the first power conversion module and the second power conversion module are turned on.

8. The power converter according to claim 1, wherein the first power conversion module and the second power conversion module operate as a buck converter using a plurality of power semiconductors connected in series between a high driving voltage and a low driving voltage.

9. A power management integrated circuit comprising:
 a first module driver configured to control a duty of a first power semiconductor included in a first power conversion module for which a first upper current limit is set;
 a second module driver configured to control a duty of a second power semiconductor included in a second power conversion module, for which a second upper current limit is set, disposed in parallel to the first power conversion module; and
 a controller configured to control the first module driver such that the first power conversion module supplies a first increment in load power in a state in which the second power conversion module is turned off, to turn on the second power conversion module when an output current of the first power conversion module reaches a first upper current limit, and to control the second module driver such that the second power conversion module supplies a second increment in the load power in a state in which the output current of the first power conversion module is maintained as the first upper current limit,
 wherein the controller is configured to increase values of the first upper current limit and the second upper current limit to supply a third increment in the load power, and
 wherein the controller is configured to increase the values of the first upper current limit and the second upper current limit at a same rate in response to the third increment in the load power.

10. The power management integrated circuit according to claim 9, wherein a size of the first power semiconductor is less than a size of the second power semiconductor.

11. The power management integrated circuit according to claim 9, further comprising an (N−1)-th module driver configured to control an (N−1)-th power conversion module, and an N-th module driver configured to control an N-th power conversion module, N being a natural number of 3 or more,
 wherein the controller turns on the N-th power conversion module when the (N−1)-th power conversion module reaches an upper power limit according to increase in the load power, and provides the increased amount of power through the N-th power conversion module.

12. The power management integrated circuit according to claim 9, wherein the load power is supplied to a gate driver, a source driver, or a display panel of a display device.

13. The power management integrated circuit according to claim 9, wherein, when both of the first power conversion module and the second power conversion module operate, the controller controls the first module driver and the second module driver such that turn-on times of the first power semiconductor and the second power semiconductor are different from each other.

14. A method for controlling a power converter, comprising:
 turning on a first power conversion module and supplying a first increment in load power using the first power conversion module for which a first upper current limit is set;

turning on a second power conversion module when an output current of the first power conversion module reaches the first upper current limit; and maintaining the output current of the first power conversion module as the first upper current limit and supplying a second increment in the load power using the second power conversion module for which a second upper current limit is set, wherein the method further comprises:

increasing values of the first upper current limit and the second upper current limit to supply a third increment in the load power, and wherein the values of the first upper current limit and the second upper current limit are increased at a same rate in response to the third increment in the load power.

15. The method according to claim 14, wherein the first power conversion module includes a first power semiconductor having a lower duty limit value, and in the supplying the first increment in the load power using the first power conversion module, the first power conversion module performs pulse skip control for skipping power conversion in some control periods when a duty of the first power semiconductor reaches the lower duty limit value.

* * * * *